(12) United States Patent
Li (10) Patent No.: US 10,554,542 B2
(45) Date of Patent: *Feb. 4, 2020

(54) LABEL DISTRIBUTION METHOD AND DEVICE

(71) Applicant: Huawei Technologies Co., Ltd., Shenzhen (CN)

(72) Inventor: Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

This patent is subject to a terminal disclaimer.

(21) Appl. No.: 15/845,851

(22) Filed: Dec. 18, 2017

(65) Prior Publication Data

US 2018/0109448 A1  Apr. 19, 2018

Related U.S. Application Data

(63) Continuation of application No. 14/562,427, filed on Dec. 5, 2014, now Pat. No. 9,893,986, which is a
(Continued)

(30) Foreign Application Priority Data

Jun. 6, 2012 (CN) .......................... 2012 1 0184111

(51) Int. Cl.
    *H04L 12/723* (2013.01)
    *H04L 12/46* (2006.01)
    *H04L 12/715* (2013.01)

(52) U.S. Cl.
    CPC ........ *H04L 45/507* (2013.01); *H04L 12/4633* (2013.01); *H04L 12/4641* (2013.01); *H04L 45/04* (2013.01)

(58) Field of Classification Search
    CPC ............... H04L 45/507; H04L 12/4633; H04L 12/4641; H04L 45/04
    See application file for complete search history.

(56) References Cited

U.S. PATENT DOCUMENTS

| 6,665,273 B1 | 12/2003 | Goguen et al. |
| 2002/0136223 A1 | 9/2002 | Ho |

(Continued)

FOREIGN PATENT DOCUMENTS

| CN | 101388823 A | 3/2009 |
| CN | 101577657 A | 11/2009 |

(Continued)

OTHER PUBLICATIONS

Rosen, E. et al: "BGP/MPLS IP Virtual Private Networks(VPNs)", Network Working Group, RFC4364.txt, Category: Standards Track, Feb. 2006, 48 pages.

(Continued)

*Primary Examiner* — Un C Cho
*Assistant Examiner* — Peter K Mak
(74) *Attorney, Agent, or Firm* — Slater Matsil, LLP (57) ABSTRACT

A label distribution method and device are disclosed. In an embodiment the method includes: a first routing device sends a first BGP update message including a first VPN instance identifier and a first RT to a second routing device; the first routing device receives a second BGP update message including a second VPN instance identifier and a second RT; the first routing device allocates a first VPN instance label to a second VPN instance after the second routing device determines that the first RT is equal to the second RT; and the first routing device sends a third BGP update message including the first VPN instance label to the second routing device. Mutual learning on VPN instances is performed, and a label is allocated to a VPN instance, so that
(Continued)

a service tail end node can identify a VPN instance from which an L3VPN service specifically comes.

24 Claims, 3 Drawing Sheets

Related U.S. Application Data continuation of application No. PCT/CN2013/076854, filed on Jun. 6, 2013.

(56) References Cited

U.S. PATENT DOCUMENTS

| | | | |
|---|---|---|---|
| 2004/0174887 A1* | 9/2004 | Lee | H04L 12/462 370/395.53 |
| 2004/0255028 A1* | 12/2004 | Chu | H04L 63/0272 709/227 |
| 2006/0013232 A1* | 1/2006 | Xu | H04L 41/00 370/396 |
| 2006/0168279 A1 | 7/2006 | Lee et al. | |
| 2007/0121524 A1* | 5/2007 | Rangarajan | H04L 45/02 370/252 |
| 2008/0080535 A1 | 4/2008 | Li et al. | |
| 2008/0101385 A1 | 5/2008 | Elias et al. | |
| 2008/0172497 A1 | 7/2008 | Mohan et al. | |
| 2009/0323698 A1 | 12/2009 | Le Faucheur et al. | |
| 2010/0246545 A1 | 9/2010 | Berzin | |
| 2010/0284305 A1 | 11/2010 | Papp et al. | |
| 2010/0284308 A1 | 11/2010 | Lv | |
| 2010/0284409 A1 | 11/2010 | Lv | |
| 2011/0013637 A1* | 1/2011 | Xue | H04L 12/4679 370/395.5 |
| 2012/0008622 A1 | 1/2012 | Cao et al. | |
| 2012/0008630 A1 | 1/2012 | Ould-Brahim | |
| 2013/0003740 A1 | 1/2013 | Zheng | |
| 2013/0155845 A1* | 6/2013 | Patel | H04L 45/04 370/225 |
| 2013/0329726 A1 | 12/2013 | Li et al. | |
| 2014/0198797 A1 | 7/2014 | Cao et al. | |
| 2014/0219135 A1 | 8/2014 | Li et al. | |
| 2014/0294004 A1* | 10/2014 | Balus | H04L 12/4641 370/390 |
| 2015/0085638 A1 | 3/2015 | Li | |
| 2015/0092780 A1 | 4/2015 | Li | |

FOREIGN PATENT DOCUMENTS

| | | |
|---|---|---|
| CN | 101631072 A | 1/2010 |
| CN | 102148738 A | 8/2011 |
| CN | 102281533 A | 12/2011 |
| CN | 102377630 A | 3/2012 |
| CN | 102724117 A | 10/2012 |
| CN | 102724118 A | 10/2012 |
| EP | 2429135 A1 | 3/2012 |
| EP | 2434697 A1 | 3/2012 |

OTHER PUBLICATIONS

Chen, M. et al, "LDP extensions for Explicit Pseudowire to transport LSP mapping, draft-cao-pwe3-mpls-tp-pw-over-bidir-lsp-02.txt", Network working group, category : standards track, Mar. 14, 2011, 9 pages.

Overview of 3GPP Release 4 V1.1.2 (Feb. 2010), 50 pages.

Awduche Movaz Networks D et al: RSVP-TE Extensions to RSVP for LSP Tunnels; rfc3209.txt, XP015018988, ISSN: 0000-0003, Dec. 1, 2001, p. 9, line 34-35, 62 pages.

Aggarwal R. et al.: Extensions to Resource Reservation Protocol—Traffic Engineering (RSVP-TE) for Point-to-Multipoint TE Label Switched Paths (LSPs), rfc4875.txt, XP15052419, ISSN: 0000-0003, May 1, 2007, p. 19, line 3-21, 53 pages.

Frost, D. et al:"MPLS Transport Profile Data Plane Architecture; rfc5960.txt", Internet Engineering Task Force, IETF; Standard, Internet Society(ISOC) 4, Geneva, Switzerland, RFC5960, ISSN: 2070-1721, XP015070920, Aug. 20, 2010, 16 pages [retrieved on Aug. 20, 2010].

* cited by examiner

| A second routing device receives a first BGP update message sent by a first routing device, where the first BGP update message includes a first VPN instance identifier and a first RT, where the first VPN instance identifier is used to identify a first VPN instance on the first routing device, and the first RT is an RT of the first VPN instance | 201 |

| The second routing device sends a second BGP update message to the first routing device after determining that the first RT is equal to a second RT, where the second BGP update message includes a second VPN instance identifier and the second RT, where the second VPN instance identifier is used to identify a second VPN instance on the second routing device, and the second RT is an RT of the second VPN instance | 202 |

| The second routing device receives a third BGP update message sent by the first routing device, where the third BGP update message includes a first VPN instance label, where the first VPN instance label is a VPN instance label that is allocated by the first routing device to the second VPN instance after the first routing device determines that the first RT is equal to the second RT | 203 |

LABEL DISTRIBUTION METHOD AND DEVICE

CROSS-REFERENCE TO RELATED APPLICATIONS

This application is a continuation of U.S. patent application Ser. No. 14/562,427, filed on Dec. 5, 2014, which is a continuation of International Application No. PCT/CN2013/076854, filed on Jun. 6, 2013. The International Application claims priority to Chinese Patent Application No. 201210184111.3, filed on Jun. 6, 2012, all of the aforementioned patent applications are hereby incorporated by reference in their entireties.

TECHNICAL FIELD

The present invention relates to communications technologies, and in particular, to a label distribution method and device.

BACKGROUND

A 3G network architecture defined by the 3rd Generation Partnership Project (The 3rd Generation Partnership Project, abbreviated as 3GPP) in the Wideband Code Division Multiple Access (Wideband Code Division Multiple Access, abbreviated as WCDMA) R4 standard mainly includes a radio access network (Radio Access Network, abbreviated as RAN), a core network (Core Network) and a bearer network (Backbone). A generalized RAN includes an air interface (Air Interface), that is, a Uu interface, between a terminal and a base station, and an Iub interface between the base station and a base station controller. From the perspective of transmission and bearing, an RAN generally refers to an aggregation network between a base station and a base station controller.

With the development of mobile networks from 2G technologies to 3G technologies and then to Long Term Evolution (Long Term Evolution, abbreviated as LTE) technologies, mobile communications networks evolve towards the direction of broadband, packetization, and flattening, and mobile all Internet Protocol (Internet Protocol, abbreviated as IP) (ALL IP) networks have become an irreversible trend. RANs are also faced with the trend of transforming from conventional time division multiplexing (Time Division Multiplex, abbreviated as TDM)/asynchronous transfer mode (Asynchronous Transfer Mode, abbreviated as ATM) RANs to IP RANs. IP RANs based on an IP/multiprotocol label switching (Multi-Protocol Label Switching, abbreviated as MPLS) packet data technology have a higher bandwidth, support statistical multiplexing of a data service, can better support a future broadband mobile service, use a same technology as an IP backbone, and have better consistency and integration with the backbone; therefore, the IP RANs are widely applied. An IP RAN based on the IP/MPLS technology mainly includes an access ring formed on a base station side by ATNs or devices of other types, and an aggregation ring formed by CXs or devices of other types. Generally, each device on an aggregation ring may access to 10 to 20 access rings. Each access ring is formed by about 10 ATNs and the like. Generally, two high-end CXs or devices of other types are placed on the aggregation ring to serve as gateways, and are connected to a core network. An ATN or another device on the access ring is referred to as a cell site gateway (Cell Site Gateway, abbreviated as CSG) or a multi-service transport gateway (Multi-Service Transport Gateway, abbreviated as MSTG). A CX or a device of another type on the aggregation ring is referred to as a radio network controller site gateway (RNC Site Gateway, abbreviated as RSG) or a multi-service aggregation gateway (Multi-Service Aggregation Gateway, abbreviated as MSAG). A device located both on the access ring and on the aggregation ring is a core router (Provider Router), that is, a P device, in an MPLS virtual private network (Virtual Private Network, abbreviated as VPN); and another device located on the access ring or the aggregation ring is a provider edge (Provider Edge, abbreviated as PE) in the MPLS VPN.

In an IP RAN network, in order to enable the MPLS technology to better meet requirements of an access network, the International Telecommunication Union-Telecommunication Standardization Sector (ITU Telecommunication Standardization Sector, abbreviated as ITU-T) and the Internet Engineering Task Force (Internet Engineering Task Force, abbreviated as IETF) jointly developed a MPLS Transport Profile (Transport Profile for MPLS, abbreviated as MPLS-TP) technology by extending a conventional MPLS technology, which mainly excludes some features in the conventional MPLS technology that are not applicable to an access network scenario and adds some new features to adapt to the requirements of the access network. For example, in the MPLS-TP technology, a complex control protocol suite defined in conventional MPLS is discarded, so that the degree of coupling between the MPLS and the IP is reduced; and the data plane is simplified, penultimate hop popping (Penultimate Hop Popping, abbreviated as PHP), equal-cost multipath (Equal Cost Multi Path, abbreviated as ECMP), label merging, refined packet discard processing, and the like are removed, technologies, such as a pseudo wire (Pseudo Wire, abbreviated as PW) multi-service bearing technology, and a time division multiplexing (Time-Division Multiplexing, abbreviated as TDM) service emulation technology are added, and operation, administration and maintenance (Operation Administration and Maintenance, abbreviated as OAM) and protection restoration functions are added.

According to the design of the MPLS-TP, OAM and protection technologies of the MPLS-TP are used for a Layer 2 service implemented by using an MPLS TE tunnel and a pseudo wire emulation edge-to-edge (Pseudo Wire Emulation Edge-to-Edge, abbreviated as PWE3) service. Because both the Layer 2 service implemented by using the MPLS TE tunnel and the PWE3 service are point-to-point, the MPLS TE tunnel or a PW can be directly identified by using a VPN private network label, so as to perform explicit fault location or performance statistics; while a Layer 3 VPN (Layer 3VPN, abbreviated as L3VPN) service is a multi-point to point service, a tail end cannot effectively identify a source end of the service.

SUMMARY

The present invention provides a label distribution method and device, which are used to solve a problem that an OAM technology cannot be used to perform effective fault location and performance detection on an L3VPN service due to the fact that a source end of the L3VPN service cannot be identified.

One aspect of embodiments of the present invention provides a label distribution method, including: sending, by a first routing device, a first Border Gateway Protocol BGP update message to a second routing device, where the first BGP update message includes a first virtual private network VPN instance identifier and a first route target RT, where the first VPN instance identifier is used to identify a first VPN instance on the first routing device, and the first RT is an RT of the first VPN instance; receiving, by the first routing device, a second BGP update message sent by the second routing device, where the second BGP update message includes a second VPN instance identifier and a second RT, where the second VPN instance identifier is used to identify a second VPN instance on the second routing device, and the second RT is an RT of the second VPN instance, and the second BGP update message is sent by the second routing device after the second routing device determines that the first RT is equal to the second RT; allocating, by the first routing device, a first VPN instance label to the second VPN instance after determining that the first RT is equal to the second RT; and sending, by the first routing device, a third BGP update message to the second routing device, where the third BGP update message includes the first VPN instance label.

Optionally, the third BGP update message further includes the first VPN instance identifier, the first RT, and the second VPN instance identifier.

Optionally, the first BGP update message further includes a first capability identifier, where the first capability identifier is used to identify that the first VPN instance supports Layer 3 virtual private network operation, administration and maintenance L3VPN OAM; and the second BGP update message further includes a second capability identifier, where the second capability identifier is used to identify that the second VPN instance supports L3VPN OAM.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, the first BGP update message further includes label encapsulation manner identification information, where the label encapsulation manner identification information is used to identify that the first routing device replaces a VPN private network route label, used in a service forwarding process, with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, where the second VPN instance label is a VPN instance label that is allocated by the second routing device to the first VPN instance after the second routing device determines that the first RT is equal to the second RT.

Optionally, the method further includes: receiving, by the first routing device, a fourth BGP update message sent by the second routing device, where the fourth BGP update message includes the second VPN instance identifier, the second RT, the first VPN instance identifier, and a second VPN instance label, where the second VPN instance label is a VPN instance label that is allocated by the second routing device to the first VPN instance after the second routing device determines that the first RT is equal to the second RT.

One aspect of the embodiments of the present invention provides a first routing device, including: a first message sending unit, configured to send a first Border Gateway Protocol BGP update message to a second routing device, where the first BGP update message includes a first virtual private network VPN instance identifier and a first route target RT, where the first VPN instance identifier is used to identify a first VPN instance on the first routing device, and the first RT is an RT of the first VPN instance; a first message receiving unit, configured to receive a second BGP update message sent by the second routing device, where the second BGP update message includes a second VPN instance identifier and a second RT, where the second VPN instance identifier is used to identify a second VPN instance on the second routing device, and the second RT is an RT of the second VPN instance; a label allocating unit, configured to allocate a first VPN instance label to the second VPN instance after determining that the first RT is equal to the second RT; and a second message sending unit, configured to send a third BGP update message to the second routing device, where the third BGP update message includes the first VPN instance label.

Optionally, the third BGP update message further includes the first VPN instance identifier, the first RT, and the second VPN instance identifier.

Optionally, the first BGP update message further includes a first capability identifier, where the first capability identifier is used to identify that the first VPN instance supports Layer 3 virtual private network operation, administration and maintenance L3VPN OAM; and the second BGP update message further includes a second capability identifier, where the second capability identifier is used to identify that the second VPN instance supports L3VPN OAM.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, the first BGP update message further includes label encapsulation manner identification information, where the label encapsulation manner identification information is used to identify that the first routing device replaces a VPN private network route label, used in a service forwarding process, with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, where the second VPN instance label is a VPN instance label that is allocated by the second routing device to the first VPN instance after the second routing device determines that the first RT is equal to the second RT.

Optionally, the first routing device further includes: a second message receiving unit, configured to receive a fourth BGP update message sent by the second routing device, where the fourth BGP update message includes the second VPN instance identifier, the second RT, the first VPN instance identifier, and a second VPN instance label, the second VPN instance label is a VPN instance label that is allocated by the second routing device to the first VPN instance after the second routing device determines that the first RT is equal to the second RT.

Another aspect of the embodiments of the present invention provides a label distribution method, including: receiving, by a second routing device, a first Border Gateway Protocol BGP update message sent by a first routing device, where the first BGP update message includes a first virtual private network VPN instance identifier and a first route target RT, where the first VPN instance identifier is used to identify a first VPN instance on the first routing device, and the first RT is an RT of the first VPN instance; sending, by the second routing device, a second BGP update message to the first routing device after determining that the first RT is equal to a second RT, where the second BGP update message includes a second VPN instance identifier and the second RT, where the second VPN instance identifier is used to identify a second VPN instance on the second routing device, and the second RT is an RT of the second VPN instance; and receiving, by the second routing device, a third BGP update message sent by the first routing device, where the third BGP update message includes a first VPN instance label, where the first VPN instance label is a VPN instance label that is allocated by the first routing device to the second VPN instance after the first routing device receives the second BGP update message.

Optionally, the third BGP update message further includes the first VPN instance identifier, the first RT, and the second VPN instance identifier.

Optionally, the first BGP update message further includes a first capability identifier, where the first capability identifier is used to identify that the first VPN instance supports Layer 3 virtual private network operation, administration and maintenance L3VPN OAM; and the second BGP update message further includes a second capability identifier, where the second capability identifier is used to identify that the second VPN instance supports L3VPN OAM.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, the first BGP update message further includes label encapsulation manner identification information, where the label encapsulation manner identification information is used to identify that the first routing device replaces a VPN private network route label, used in a service forwarding process, with a second VPN instance label, and encapsulates the second VPN instance label and a tunnel label into a VPN packet in the service forwarding process, or identify that the first routing device adds the second VPN instance label to a label used in a service forwarding process, and encapsulates the second VPN instance label, a VPN private network route label, and a tunnel label into a VPN packet in the service forwarding process, where the second VPN instance label is a VPN instance label that is allocated by the second routing device to the first VPN instance after the second routing device determines that the first RT is equal to the second RT.

Optionally, the method further includes: replacing, by the second routing device, the VPN private network route label, used in the service forwarding process, with the first VPN instance label, so as to encapsulate the first VPN instance label and the tunnel label into the VPN packet in the service forwarding process; or adding, by the second routing device, the first VPN instance label to the label used in the service forwarding process, so as to encapsulate the first VPN instance label, the VPN private network route label, and the tunnel label into the VPN packet in the service forwarding process.

Optionally, the method further includes: sending, by the second routing device, a fourth BGP update message to the first routing device, where the fourth BGP update message includes the second VPN instance identifier, the second RT, the first VPN instance identifier, and a second VPN instance label, where the second VPN instance label is a VPN instance label that is allocated by the second routing device to the first VPN instance after the second routing device determines that the first RT is equal to the second RT.

Another aspect of the embodiments of the present invention provides a second routing device, including: a third message receiving unit, configured to receive a first Border Gateway Protocol BGP update message sent by a first routing device, where the first BGP update message includes a first virtual private network VPN instance identifier and a first route target RT, where the first VPN instance identifier is used to identify a first VPN instance on the first routing device, and the first RT is an RT of the first VPN instance; a third message sending unit, configured to send a second BGP update message to the first routing device after determining that the first RT is equal to a second RT, where the second BGP update message includes a second VPN instance identifier and the second RT, where the second VPN instance identifier is used to identify a second VPN instance on the second routing device, and the second RT is an RT of the second VPN instance; and a fourth message receiving unit, configured to receive a third BGP update message sent by the first routing device, where the third BGP update message includes a first VPN instance label, where the first VPN instance label is a VPN instance label that is allocated by the first routing device to the second VPN instance after determining that the first RT is equal to the second RT.

Optionally, the third BGP update message further includes the first VPN instance identifier, the first RT, and the second VPN instance identifier.

Optionally, the first BGP update message further includes a first capability identifier, where the first capability identifier is used to identify that the first VPN instance supports Layer 3 virtual private network operation, administration and maintenance L3VPN OAM; and the second BGP update message further includes a second capability identifier, where the second capability identifier is used to identify that the second VPN instance supports L3VPN OAM.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, the first BGP update message further includes label encapsulation manner identification information, where the label encapsulation manner identification information is used to identify that the first routing device replaces a VPN private network route label, used in a service forwarding process, with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, where the second VPN instance label is a VPN instance label that is allocated by the second routing device to the first VPN instance after the second routing device determines that the first RT is equal to the second RT.

Optionally, the second routing device further includes: a label replacing unit, configured to replace the VPN private network route label, used in the service forwarding process, with the first VPN instance label, so as to encapsulate the first VPN instance label and the tunnel label into the VPN packet in the service forwarding process; and/or a label adding unit, configured to add the first VPN instance label to the label used in the service forwarding process, so as to encapsulate the first VPN instance label, the VPN private network route label, and the tunnel label into the VPN packet in the service forwarding process.

Optionally, the second routing device further includes: a fourth message sending unit, configured to send a fourth BGP update message to the first routing device, where the fourth BGP update message includes the second VPN instance identifier, the second RT, the first VPN instance identifier, and a second VPN instance label, where the second VPN instance label is a VPN instance label that is allocated by the second routing device to the first VPN instance after the second routing device determines that the first RT is equal to the second RT.

As can be seen from the foregoing description, in the technical solutions provided by the embodiments of the present invention, a first routing device and a second routing device extend the MP-BGP and learn a VPN instance from each other, so as to identify a VPN instance, and can allocate a label to the VPN instance after identifying the VPN instance, so that when a routing device used as a service tail end node receives an L3VPN service packet carrying a VPN instance label allocated by the routing device, the routing device identifies, according to the VPN instance label in the packet, a VPN instance from which an L3VPN service specifically comes.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1A:
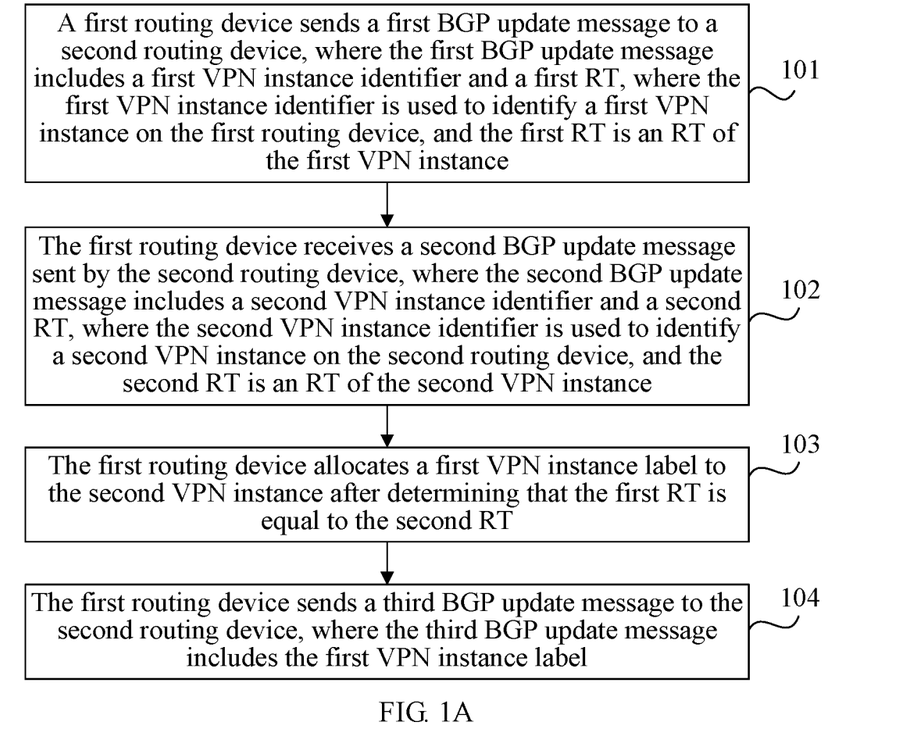
FIG. 1A is a flowchart of a label distribution method according to an embodiment of the present invention.

FIG. 1A is a flowchart of a label distribution method according to an embodiment of the present invention. As shown in FIG. 1A, the method in this embodiment includes:

Step 101: A first routing device sends a first Border Gateway Protocol (Border Gateway Protocol, abbreviated as BGP) update message to a second routing device, where the first BGP update message includes a first VPN instance identifier and a first route target (Route Target, abbreviated as RT), where the first VPN instance identifier is used to identify a first VPN instance on the first routing device, and the first RT is an RT of the first VPN instance.

In this embodiment, the first routing device and the second routing device may be PEs, for example, the first routing device is a first PE, and the second routing device is a second PE, which are not limited herein.

For a service between the first VPN instance on the first routing device and a second VPN instance on the second routing device, the first VPN instance and the second VPN instance may be classified into a service active role and a service passive role. Which end being the service active role and which end being the service passive role may be determined by means of configuration or by means of protocol negotiation. If a configuration manner is used, before step 101, a service role needs to be pre-configured respectively for the first VPN instance and the second VPN instance at two ends of the service, and the configured service role is a service passive role or a service active role. In this embodiment, the first VPN instance on the first routing device is a service active role of the service between the first VPN instance and the second VPN instance, and the second VPN instance on the second routing device is a service passive role of the service between the first VPN instance and the second VPN instance.

In this embodiment, the service between the first VPN instance and the second VPN instance is an L3VPN service.

In a process of carrying out the L3VPN service, the first routing device may perform service negotiation with the second routing device by using the Multiprotocol Border Gateway Protocol (multiprotocol-border gateway protocol, abbreviated as MP-BGP). However, in an existing L3VPN mechanism, a VPN private network route and a VPN private network label are mutually notified between the first routing device and the second routing device. Multiple IP routes exist in one VPN instance, the VPN private network route refers to an IP route in the VPN instance, and the VPN private network label is a label used to identify the VPN private network route. In this embodiment, in order to perform effective fault location and performance detection on the L3VPN service by using an OAM technology (that is, in order to solve the problem of L3VPN OAM), a label needs to be allocated to the VPN instance instead of the VPN private network route, and in order to allocate a label to the VPN instance, the problem that needs to be first solved is the problem of how to identify the VPN instance. Based on this, the first routing device extends the MP-BGP, and notifies the second routing device of the first VPN instance identifier identifying the first VPN instance, and the first RT by using the extended MP-BGP (the first BGP update message belongs to the extended MP-BGP).

The first VPN instance, on the first routing device, that is identified by the first VPN instance identifier is actually a VPN instance, bearing the L3VPN service, on the first routing device.

Step 102: The first routing device receives a second BGP update message sent by the second routing device, where the second BGP update message includes a second VPN instance identifier and a second RT, where the second VPN instance identifier is used to identify a second VPN instance on the second routing device, and the second RT is an RT of the second VPN instance.

In this embodiment, RTs of VPN instances, for example, the RT of the first VPN instance and the RT of the second VPN instance, are mainly used for the first routing device and the second routing device to determine whether a service peer relationship exists between VPN instances of the first routing device and the second routing device. That is, whether a service peer relationship exists between two VPN instances is determined by using RTs of the two VPN instances. If an import (Import) RT of one VPN instance is equal to an export (Export) RT of the other VPN instance, it indicates that a service peer relationship exists between the two VPN instances. In this embodiment, the RT of the first VPN instance on the first routing device, that is, the first RT, is considered as an import RT, and the RT of the second VPN instance on the second routing device is considered as an export RT. In this embodiment, one VPN instance on the second routing device and having a service peer relationship with the first VPN instance is the second VPN instance.

After receiving the first BGP update message, the second routing device obtains the first RT from the first BGP update message, then, compares the first RT with the second RT, and if the first RT is equal to the second RT, may determine that a service peer relationship exists between the first VPN instance and the second VPN instance. The second RT is the RT of the second VPN instance on the second routing device, and the second VPN instance is identified by using the second VPN instance identifier.

After determining that the first RT is equal to the second RT, the second routing device sends the second BGP update message to the first routing device, and adds the second VPN instance identifier and the second RT to the second BGP update message, so as to notify the first routing device of the second VPN instance identifier and the second RT.

The second VPN instance, on the second routing device, that is identified by the second VPN instance identifier is actually a VPN instance, bearing the L3VPN service, on the second routing device.

Step 103: The first routing device allocates a first VPN instance label to the second VPN instance after determining that the first RT is equal to the second RT.

Correspondingly, after determining that the first RT is equal to the second RT, the first routing device may determine that a service peer relationship exists between the first VPN instance and the second VPN instance. The first routing device allocates a VPN instance label, that is, the first VPN instance label, to the second VPN instance after determining that the first RT is equal to the second RT. The first VPN instance label is allocated to the VPN instance, is a label used to identify a VPN instance route, and is different from a VPN private network label identifying a VPN private network route in the prior art.

Step 104: The first routing device sends a third BGP update message to the second routing device, where the third BGP update message includes the first VPN instance label.

After allocating the first VPN instance label to the second VPN instance, the first routing device sends the first VPN instance label to the second routing device by using the third BGP update message; in this way, when receiving an L3VPN service packet carrying the first VPN instance label, the first routing device can identify, according to the first VPN instance label in the packet, that the L3VPN service specifically comes from the second VPN instance. Optionally, after identifying that the L3VPN service comes from the second VPN instance, the first routing device can perform the effective fault location and performance detection on the L3VPN service by using the OAM technology.

Optionally, the third BGP update message may further include information such as the first VPN instance identifier, the first RT, and the second VPN instance identifier besides the first VPN instance label.

As can be seen from the foregoing description, in this embodiment, a first routing device and a second routing device extend the MP-BGP, that is, carry a VPN instance identifier by using a BGP update message, so that routing devices that carry out an L3VPN service can learn a VPN instance of a peer end from each other, so as to identify a VPN instance corresponding to the L3VPN service, and the first routing device and the second routing device can allocate a label to the VPN instance after identifying the VPN instance; in this way, when a routing device used as a service tail end node receives an L3VPN service packet carrying a VPN instance label allocated by the tail end node itself, the routing device can identify, according to the VPN instance label carried in the packet, a VPN instance from which the L3VPN service specifically comes, which solves a problem of identifying a source end of the L3VPN service. Optionally, after identifying the VPN instance from which the L3VPN service comes, the routing device used as the service tail end node can perform effective fault location and performance detection on the L3VPN service by using an OAM technology, which solves a problem of L3VPN OAM, and provides a basis for further development of an L3VPN OAM technology.

In an optional implementation manner of the foregoing embodiment, the first routing device and the second routing device may carry the RTs of the VPN instances and the VPN instance identifiers by using attribute information and network layer reachability information (Network Layer Reachability Information, abbreviated as NLRI), or carry the VPN instance identifiers and the RTs of the VPN instances by using NLRI.

Based on the foregoing description, a process of sending, by the first routing device, the first BGP update message to the second routing device may be that: the first routing device encapsulates the first RT into attribute information in the first BGP update message, encapsulates the first VPN instance identifier into an NLRI object in the first BGP update message, and then sends, to the second routing device, the first BGP update message into which the first RT and the first VPN instance identifier are encapsulated. Alternatively, a process of sending, by the first routing device, the first BGP update message to the second routing device may be that: the first routing device encapsulates the first RT and the first VPN instance identifier into an NLRI object in the first BGP update message, and then sends, to the second routing device, the first BGP update message into which the first RT and the first VPN instance identifier are encapsulated. Correspondingly, a process of receiving, by the first routing device, the second BGP update message sent by the second routing device may be that: the first routing device receives the second BGP update message sent by the second routing device, parses the second BGP update message, obtains the second RT from attribute information in the second BGP update message, and obtains the second VPN instance identifier from an NLRI object in the second BGP update message. Alternatively, a process of receiving, by the first routing device, the second BGP update message sent by the second routing device may be that: the first routing device receives the second BGP update message sent by the second routing device, parses the second BGP update message, and obtains the second RT and the second VPN instance identifier from an NLRI object in the second BGP update message.

In an optional implementation manner of the foregoing embodiment, the VPN instance identifier may include a route distinguisher (Router Distinguisher, abbreviated as RD) and an IP address. RDs are used to distinguish different VPN instances on a same device. The first VPN instance identifier includes a first RD and a first IP address. The first RD is an RD of the first VPN instance, the first IP address is an IP address of the first routing device, and the first IP address identifies the first routing device instead of an IP route of a VPN instance on the first routing device. Correspondingly, the second VPN instance identifier includes a second RD and a second IP address. The second RD is an RD of the second VPN instance, the second IP address is an IP address of the second routing device, and the second IP address identifies the second routing device instead of an IP route of a VPN instance on the second routing device.

Further, the NRLI further includes next hop information. The next hop information refers to next hop information of the first IP address or the second IP address.

Figure 1B:
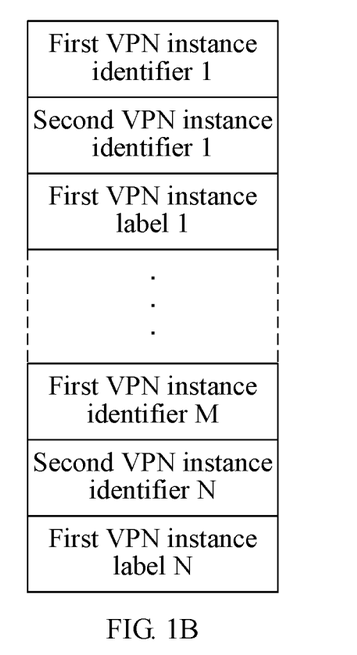
FIG. 1B is a schematic structural diagram of multiple VPN instance labels carried in a label distribution message according to an embodiment of the present invention.

In an optional implementation manner of the foregoing embodiment, if the first routing device carries out the L3VPN service with multiple routing devices, multiple first VPN instance labels may be carried in one third BGP update message, and a structure thereof is shown in FIG. 1B. In the third BGP update message shown in FIG. 1B, the first routing device carries out the L3VPN service with N routing devices at the same time, VPN instances on the N routing devices respectively are a second VPN instance 1, a second VPN instance 2, . . . , and a second VPN instance N, which are identified by using a second VPN instance identifier 1, a second VPN instance identifier 2, . . . , and a second VPN instance identifier N, respectively. Correspondingly, first VPN instance labels allocated by the first routing device to the VPN instances on the N routing devices respectively are a first VPN instance label 1, a first VPN instance label 2, . . . , and a first VPN instance label N; and VPN instances on the first routing device that carry out the L3VPN service with the N VPN instances on the N routing devices respectively are a first VPN instance 1, a first VPN instance 2, . . . , and a first VPN instance M, which are identified by using a first VPN instance identifier 1, a first VPN instance identifier 2, . . . , and a first VPN instance identifier M, respectively. Because a same first VPN instance may carry out the L3VPN service with second VPN instances on multiple routing devices, M<=N. To simplify the drawing, the first RT is not shown in FIG. 1B.

In an optional implementation manner of the foregoing embodiment, the first routing device and the second routing device may further learn an L3VPN OAM capability, that is, notify each other of whether a VPN instance that carries out a service supports L3VPN OAM. Specifically, if the first VPN instance supports L3VPN OAM, the first BGP update message sent by the first routing device to the second routing device may further include a first capability identifier, where the first capability identifier is used to identify that the first VPN instance supports L3VPN OAM. If the second VPN instance supports L3VPN OAM, the second BGP update message sent by the second routing device to the first routing device may further include a second capability identifier, where the second capability identifier is used to identify that the second VPN instance supports L3VPN OAM.

Optionally, whether a VPN instance supports L3VPN OAM may be determined in the following manner: if local cross occurs in the VPN instance, it means that L3VPN OAM cannot be performed, that is, L3VPN OAM is not supported. If local cross does not occur in the VPN instance, an L3VPN OAM capability identifier may be set, indicating that L3VPN OAM is supported.

In addition, if L3VPN traffic enters from multiple interfaces and flows out of a tunnel at another end of a service, it is also a multipoint to point problem. Based on this, whether a VPN instance supports L3VPN OAM may also be determined in the following manner: if hardware implementation of a routing device can well support multipoint to point traffic statistics, it can be considered that a VPN instance on the routing device supports L3VPN OAM; otherwise, it is considered that the VPN instance on the routing device cannot support L3VPN OAM.

The method for determining whether a VPN instance supports L3VPN OAM may be to automatically determine whether a VPN instance supports L3VPN OAM according to local configuration information, which is not limited herein. In an actual application, whether a VPN instance that carries out a specific L3VPN service supports the OAM may also be configured according to a plan, and negotiation is performed by extending the MP-BGP, and then a peer end is notified.

In an optional implementation manner of the foregoing embodiment, the first routing device also receives a fourth BGP update message sent by the second routing device. The fourth BGP update message includes the second VPN instance identifier, the second RT, the first VPN instance identifier, and a second VPN instance label. Specifically, the second routing device allocates a VPN instance label, that is, the second VPN instance label, to the first VPN instance on the first routing device after determining that the first RT is equal to the second RT, that is, determining that a service relationship exists between the first VPN instance and the second VPN instance. Similarly, after allocating the second VPN instance label to the first VPN instance, the second routing device sends the second VPN instance label to the first routing device by using the fourth BGP update message.

For the first routing device, after the first routing device receives the second VPN instance label distributed by the second routing device, the second VPN instance label, a VPN private network route label, and a tunnel label exist on the first routing device. Based on this, when forwarding the L3VPN service, the first routing device needs to encapsulate the second VPN instance label; in this way, when receiving a service packet into which the second VPN instance label is encapsulated, the second routing device can determine that the service packet comes from the first VPN instance.

In an optional implementation manner of the foregoing embodiment, after obtaining the second VPN instance label, the first routing device may replace a VPN private network route label used in a service forwarding process with the second VPN instance label. Based on this, when performing service forwarding, the first routing device may encapsulate the second VPN instance label and the tunnel label into a VPN packet in the service forwarding process. In this implementation manner, the first routing device only needs to replace the VPN private network route label with the second VPN instance label, to match a structure in which a VPN packet carries two layers of labels in the prior art, which facilitates improvement of the carrying efficiency of a packet.

In an optional implementation manner of the foregoing embodiment, after obtaining the second VPN instance label, the first routing device may further add the second VPN instance label to a label used in the service forwarding process. Based on this, when performing service forwarding, the first routing device may encapsulate the second VPN instance label, the VPN private network route label, and the tunnel label into a VPN packet in the service forwarding process. In this implementation manner, the first routing device may not change a manner of allocating a VPN private network label to a VPN private network route in the prior art, but only needs to add an operation of allocating the second VPN instance label.

Based on the foregoing description, the first routing device may further add label encapsulation manner identification information to the first BGP update message. The label encapsulation manner identification information is used to identify that the first routing device replaces the VPN private network route label used in the service forwarding process with the second VPN instance label, and encapsulates the second VPN instance label and the tunnel label into the VPN packet in the service forwarding process. In this implementation manner, when the first routing device distributes the first VPN instance label to the second routing device, private network routes in a local VPN instance all use a same label, that is, use the second VPN instance label allocated by the second routing device. However, for different routing devices, when the first routing device distributes respective VPN instance labels corresponding to these routing devices to these routing devices, different VPN instance labels need to be used.

Alternatively, the label encapsulation manner identification information is used to identify that the first routing device adds the second VPN instance label to the label used in the service forwarding process, and encapsulates the second VPN instance label, the VPN private network route label, and the tunnel label into the VPN packet in the service forwarding process.

The first routing device notifies the second routing device of a manner of using the second VPN instance label by the first routing device, for reference by the second routing device, so that when having a same capability, the first routing device and the second routing device can use an allocated VPN instance label in a same manner as far as possible.

In this embodiment, a first routing device and a second routing device extend the MP-BGP and learn a VPN instance from each other, so as to identify a VPN instance, and can allocate a label to the VPN instance instead of a VPN private network route after identifying the VPN instance; in this way, when a routing device used as a service tail end node receives an L3VPN service packet carrying a VPN instance label allocated by the tail end node itself, the routing device can identify, according to the VPN instance label carried in the packet, a VPN instance from which an L3VPN service specifically comes, which solves a problem of identifying a source end of the L3VPN service. Optionally, after identifying the VPN instance from which the L3VPN service comes, the routing device used as the service tail end node can perform effective fault location and performance detection on the L3VPN service by using an OAM technology, which solves a problem of L3VPN OAM, and provides a basis for further development of an L3VPN OAM technology.

Figure 2:
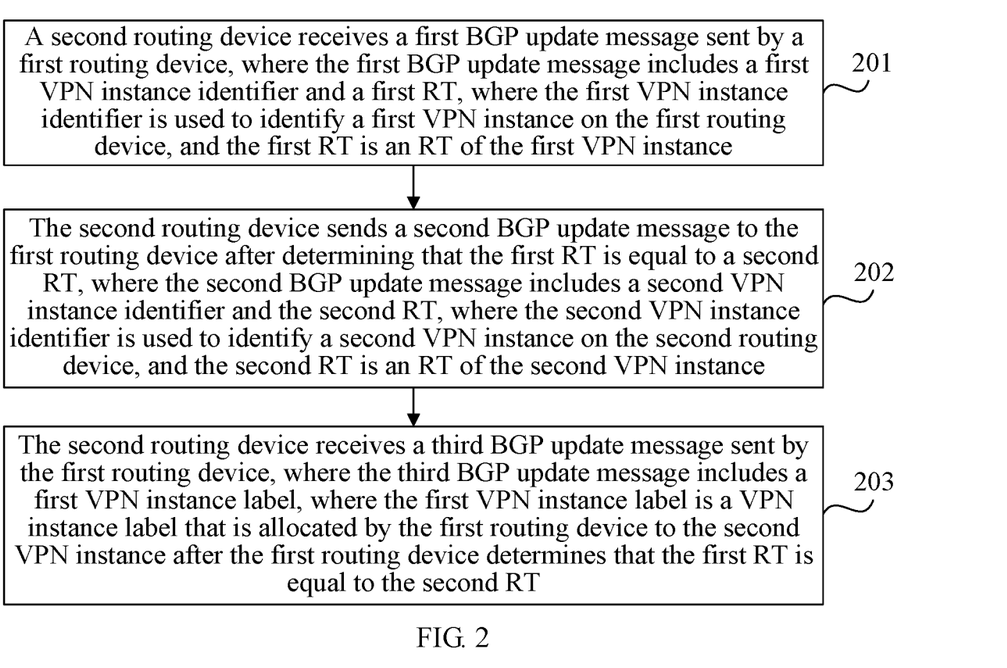
FIG. 2 is a flowchart of a label distribution method according to another embodiment of the present invention.

FIG. 2 is a flowchart of a label distribution method according to another embodiment of the present invention. As shown in FIG. 2, the method in this embodiment includes:

Step 201: A second routing device receives a first BGP update message sent by a first routing device, where the first BGP update message includes a first VPN instance identifier and a first RT, where the first VPN instance identifier is used to identify a first VPN instance on the first routing device, and the first RT is an RT of the first VPN instance.

In this embodiment, the first routing device and the second routing device may be PEs, for example, the first routing device is a first PE, and the second routing device is a second PE, which are not limited herein.

For a service between the first VPN instance on the first routing device and a second VPN instance on the second routing device, the first VPN instance and the second VPN instance may be classified into a service active role and a service passive role. Which end being the service active role and which end being the service passive role may be determined by means of configuration or by means of protocol negotiation. If a configuration manner is used, before step 201, a service role needs to be pre-configured respectively for the first VPN instance and the second VPN instance at two ends of the service, and the configured service role is a service passive role or a service active role. In this embodiment, the first VPN instance on the first routing device is a service active role of the service between the first VPN instance and the second VPN instance, and the second VPN instance on the second routing device is a service passive role of the service between the first VPN instance and the second VPN instance.

In this embodiment, the service between the first VPN instance and the second VPN instance is an L3VPN service.

In a process of carrying out the L3VPN service, the second routing device may perform service negotiation with the first routing device by using the MP-BGP. However, in an existing L3VPN mechanism, a VPN private network route and a VPN private network label are mutually notified between the first routing device and the second routing device. Multiple IP routes exist in one VPN instance, the VPN private network route refers to an IP route in the VPN instance, and the VPN private network label is a label used to identify the VPN private network route. In this embodiment, in order to perform effective fault location and performance detection on the L3VPN service by using an OAM technology (that is, in order to solve the problem of L3VPN OAM), a label needs to be allocated to the VPN instance instead of the VPN private network route, and in order to allocate a label to the VPN instance, the problem that needs to be first solved is the problem of how to identify the VPN instance. Based on this, the first routing device extends the MP-BGP, and notifies the second routing device of the first VPN instance identifier identifying the first VPN instance, and the first RT by using the extended MP-BGP (the first BGP update message belongs to the extended MP-BGP).

Correspondingly, the second routing device receives the first BGP update message sent by the first routing device, and obtains the first VPN instance identifier and the first RT from the first BGP update message.

The first VPN instance, on the first routing device, that is identified by the first VPN instance identifier is actually a VPN instance, bearing the L3VPN service, on the first routing device.

Step 202: The second routing device sends a second BGP update message to the first routing device after determining that the first RT is equal to a second RT, where the second BGP update message includes a second VPN instance identifier and the second RT, where the second VPN instance identifier is used to identify a second VPN instance on the second routing device, and the second RT is an RT of the second VPN instance.

In this embodiment, RTs of VPN instances, for example, the RT of the first VPN instance and the RT of the second VPN instance, are mainly used for the first routing device and the second routing device to determine whether a service peer relationship exists between VPN instances of the first routing device and the second routing device. That is, whether a service peer relationship exists between two VPN instances is determined by using RTs of the two VPN instances. If an import (Import) RT of one VPN instance is equal to an export (Export) RT of the other VPN instance, it indicates that a service peer relationship exists between the two VPN instances. In this embodiment, the RT of the first VPN instance on the first routing device, that is, the first RT, is considered as an import RT, and the RT of the second VPN instance on the second routing device is considered as an export RT. In this embodiment, one VPN instance on the second routing device and having a service peer relationship with the first VPN instance is the second VPN instance.

After learning the first RT, the second routing device may compare the first RT with the second RT, and if the first RT is equal to the second RT, may determine that a service peer relationship exists between the first VPN instance and the second VPN instance. The second RT is the RT of the second VPN instance on the second routing device, and the second VPN instance is identified by using the second VPN instance identifier.

After determining that the first RT is equal to the second RT, the second routing device sends the second BGP update message to the first routing device, and adds the second VPN instance identifier and the second RT to the second BGP update message, so as to notify the first routing device of the second VPN instance identifier and the second RT.

The second VPN instance, on the second routing device, that is identified by the second VPN instance identifier is actually a VPN instance, bearing the L3VPN service, on the second routing device.

Step 203: The second routing device receives a third BGP update message sent by the first routing device, where the third BGP update message includes a first VPN instance label, where the first VPN instance label is a VPN instance label that is allocated by the first routing device to the second VPN instance after the first routing device determines that the first RT is equal to the second RT.

Correspondingly, the first routing device also obtains the second VPN instance and the second RT from the second BGP update message after receiving the second BGP update message. Then, the first routing device compares the first RT with the second RT, determines whether the first RT is equal to the second RT, and determines, after determining that the first RT is equal to the second RT, that a service peer relationship exists between the first VPN instance and the second VPN instance. The first routing device allocates a VPN instance label, that is, the first VPN instance label, to the second VPN instance after determining that the first RT is equal to the second RT. The first VPN instance label is allocated to the VPN instance, is a label used for a VPN instance route, and is different from a VPN private network label identifying a VPN private network route in the prior art.

After allocating the first VPN instance label to the second VPN instance, the first routing device sends the first VPN instance label to the second routing device by using the third BGP update message. Correspondingly, the second routing device receives the third BGP update message sent by the first routing device, and obtains the first VPN instance label from the third BGP update message. In this way, when receiving an L3VPN service packet carrying the first VPN instance label, the first routing device can identify, according to the VPN instance label carried in the packet, that the L3VPN service specifically comes from the second VPN instance. Optionally, after identifying that the L3VPN service comes from the second VPN instance, the first routing device can perform the effective fault location and performance detection on the L3VPN service by using the OAM technology.

Optionally, the third BGP update message may further include information such as the first VPN instance identifier, the first RT, and the second VPN instance identifier besides the first VPN instance label.

Optionally, the second routing device may allocate a second VPN instance label to the first VPN instance after determining that the first RT is equal to the second RT. The second routing device may send a fourth BGP update message to the first routing device after allocating the second VPN instance label to the first VPN instance, where the fourth BGP update message includes the second instance identifier, the second RT, the first VPN instance identifier, and the second VPN instance label. In this way, when receiving an L3VPN service packet carrying the second VPN instance label, the second routing device can identify, according to the VPN instance label in the packet, that the L3VPN service specifically comes from the first VPN instance. Optionally, after identifying that the L3VPN service comes from the first VPN instance, the second routing device can perform the effective fault location and performance detection on the L3VPN service by using the OAM technology.

As can be seen from the foregoing description, in this embodiment, a first routing device and a second routing device extend the MP-BGP, that is, carry a VPN instance identifier by using a BGP update message, so that routing devices that carry out an L3VPN service at two ends can learn a VPN instance of a peer end from each other, so as to identify a VPN instance corresponding to the L3VPN service, and the first routing device and the second routing device can allocate a label to the VPN instance after identifying the VPN instance; in this way, when a routing device used as a service tail end node receives an L3VPN service packet carrying a VPN instance label allocated by the tail end node itself, the routing device can identify, according to the VPN instance label in the packet, a VPN instance from which the L3VPN service specifically comes, which solves a problem of identifying a source end of the L3VPN service. For example, after the first routing device allocates a first VPN instance label to a second VPN instance, if the first routing device used as a service tail end node receives a service packet into which the first VPN instance label is encapsulated, the first routing device can determine that the service packet comes from the second VPN instance. Optionally, based on the method in this embodiment, effective fault location and performance detection can be further performed on the L3VPN service by using an OAM technology, which solves a problem of L3VPN OAM, and provides a basis for further development of an L3VPN OAM technology.

In an optional implementation manner of the foregoing embodiment, the first routing device and the second routing device may carry the RTs of the VPN instances and the VPN instance identifiers by using attribute information and NLRI, or carry the VPN instance identifiers and the RTs of the VPN instances by using NLRI.

Based on the foregoing description, a process of receiving, by the second routing device, the first BGP update message sent by the first routing device may be that: the second routing device receives the first BGP update message sent by the first routing device, parses the first BGP update message, obtains the first RT from attribute information in the first BGP update message, and obtains the first VPN instance identifier from an NLRI object in the first BGP update message. Alternatively, a process of receiving, by the second routing device, the first BGP update message sent by the first routing device may be that: the second routing device receives the first BGP update message sent by the first routing device, parses the first BGP update message, and obtains the first RT and the first VPN instance identifier from an NLRI object in the first BGP update message. Correspondingly, a process of sending, by the second routing device, the second BGP update message to the first routing device may be that: the second routing device encapsulates the second RT into attribute information in the second BGP update message, encapsulates the second VPN instance identifier into an NLRI object in the second BGP update message, and then sends, to the first routing device, the second BGP update message into which the second RT and the second VPN instance identifier are encapsulated. Alternatively, a process of sending, by the second routing device, the second BGP update message to the first routing device may be that: the second routing device encapsulates the second RT and the second VPN instance identifier into an NLRI object in the second BGP update message, and then, sends, to the first routing device, the second BGP update message into which the second RT and the second VPN instance identifier are encapsulated.

In an optional implementation manner of the foregoing embodiment, the VPN instance identifier may include an RD and an IP address. RDs are used to distinguish different VPN instances on a same device. The first VPN instance identifier includes a first RD and a first IP address. The first RD is an RD of the first VPN instance, the first IP address is an IP address of the first routing device, and the first IP address identifies the first routing device instead of an IP route of a VPN instance on the first routing device. Correspondingly, the second VPN instance identifier includes a second RD and a second IP address. The second RD is an RD of the second VPN instance, the second IP address is an IP address of the second routing device, and the second IP address identifies the second routing device instead of an IP route of a VPN instance on the second routing device.

Further, the NRLI further includes next hop information. The next hop information refers to next hop information of the first IP address or the second IP address.

In an optional implementation manner of the foregoing embodiment, the first routing device and the second routing device may further learn an L3VPN OAM capability, that is, notify each other of whether a VPN instance that carries out a service supports L3VPN OAM. Specifically, if the first VPN instance supports L3VPN OAM, the first BGP update message sent by the first routing device to the second routing device may further include a first capability identifier, where the first capability identifier is used to identify that the first VPN instance supports L3VPN OAM. If the second VPN instance supports L3VPN OAM, the second BGP update message sent by the second routing device to the first routing device may further include a second capability identifier, where the second capability identifier is used to identify that the second VPN instance supports L3VPN OAM.

Whether a VPN instance supports L3VPN OAM may be determined in the following manner: if local cross occurs in the VPN instance, it means that L3VPN OAM cannot be performed, that is, L3VPN OAM is not supported. If local cross does not occur in the VPN instance, an L3VPN OAM capability identifier may be set, indicating that L3VPN OAM is supported.

In addition, if L3VPN traffic enters from multiple interfaces and flows out of a tunnel at another end of a service, it is also a multipoint to point problem. Based on this, whether a VPN instance supports L3VPN OAM may also be determined in the following manner: if hardware implementation of a routing device can well support multipoint to point traffic statistics, it can be considered that a VPN instance on the routing device supports L3VPN OAM; otherwise, it is considered that the VPN instance on the routing device cannot support L3VPN OAM.

The method for determining whether a VPN instance supports L3VPN OAM may be to automatically determine whether a VPN instance supports L3VPN OAM according to local configuration information, which is not limited herein. In an actual application, whether a VPN instance that carries out a specific L3VPN service supports the OAM may also be configured according to a plan, and negotiation is performed by extending the MP-BGP, and then a peer end is notified.

In an optional implementation manner of the foregoing embodiment, the first BGP update message may further include label encapsulation manner identification information. Alternatively, the label encapsulation manner identification information is used to identify that the first routing device replaces a VPN private network route label used in a service forwarding process with the second VPN instance label, and encapsulates the second VPN instance label and a tunnel label into a VPN packet in the service forwarding process, or used to identify that the first routing device adds the second VPN instance label to a label used in a service forwarding process, and encapsulates the second VPN instance label, a VPN private network route label, and a tunnel label into a VPN packet in the service forwarding process.

The second routing device may use, according to the label encapsulation manner identification information sent by the first routing device, a manner of using the second VPN instance label by the first routing device, as a reference for using the first VPN instance label by the second routing device, so that when having a same capability, the first routing device and the second routing device use an allocated VPN instance label in a same manner as far as possible.

In an optional implementation manner of the foregoing embodiment, after obtaining the first VPN instance label, the second routing device may replace the VPN private network route label, used in the service forwarding process, with the first VPN instance label, so as to encapsulate the first VPN instance label and the tunnel label into the VPN packet in the service forwarding process when service forwarding is performed. In this implementation manner, the second routing device only needs to replace the VPN private network route label with the first VPN instance label, to match a structure in which a VPN packet carries two layers of labels in the prior art, which facilitates improvement of the carrying efficiency of a packet.

In an optional implementation manner of the foregoing embodiment, after obtaining the first VPN instance label, the second routing device may further add the first VPN instance label to the label used in the service forwarding process, so as to encapsulate the first VPN instance label, the VPN private network route label, and the tunnel label into the VPN packet in the service forwarding process when service forwarding is performed. In this implementation manner, the second routing device may not change a manner of allocating a VPN private network label to a VPN private network route in the prior art, but only needs to add an operation of allocating the first VPN instance label.

In this embodiment, a first routing device and a second routing device extend the MP-BGP and learn a VPN instance from each other, so as to identify a VPN instance, and can allocate a label to the VPN instance instead of a VPN private network route after identifying the VPN instance; in this way, when a routing device used as a service tail end node receives an L3VPN service packet carrying a VPN instance label allocated by the tail end node, the routing device can identify, according to the VPN instance label in the packet, a VPN instance from which an L3VPN service specifically comes, which solves a problem of identifying a source end of the L3VPN service. Optionally, based on the method in this embodiment, effective fault location and performance detection can be further performed on the L3VPN service by using an OAM technology, which solves a problem of L3VPN OAM, and provides a basis for further development of an L3VPN OAM technology.

Figure 3A:
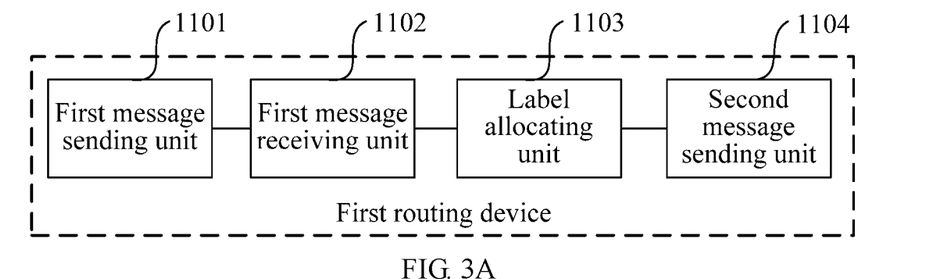
FIG. 3A is a schematic structural diagram of a first routing device according to an embodiment of the present invention.

FIG. 3A is a schematic structural diagram of a first routing device according to an embodiment of the present invention. As shown in FIG. 3A, the first routing device in this embodiment includes: a first message sending unit 1101, a first message receiving unit 1102, a label allocating unit 1103, and a second message sending unit 1104.

The first message sending unit 1101 is configured to send a first BGP update message to a second routing device, where the first BGP update message includes a first VPN instance identifier and a first RT, where the first VPN instance identifier is used to identify a first VPN instance on the first routing device in this embodiment, and the first RT is an RT of the first VPN instance. Optionally, the first message sending unit 1101 is a physical transmit port.

The first message receiving unit 1102 is configured to receive a second BGP update message sent by the second routing device, where the second BGP update message includes a second VPN instance identifier and a second RT, where the second VPN instance identifier is used to identify a second VPN instance on the second routing device, and the second RT is an RT of the second VPN instance. The first message receiving unit 1102 specifically receives, after the first message sending unit 1101 sends the first BGP update message to the second routing device, the second BGP update message sent by the second routing device. Optionally, the first message receiving unit 1102 is connected to the first message sending unit 1101. Optionally, the first message receiving unit 1102 is a physical receive port.

The label allocating unit 1103 is connected to the first message receiving unit 1102, and is configured to allocate a first VPN instance label to the second VPN instance after it is determined that the first RT is equal to the second RT received by the first message receiving unit 1102. Optionally, the label allocating unit 1103 is a processor.

The second message sending unit 1104 is connected to the label allocating unit 1103, and is configured to send a third BGP update message to the second routing device, where the third BGP update message includes the first VPN instance label allocated by the label allocating unit 1103. Optionally, the second message sending unit 1104 is a physical transmit port.

Optionally, the third BGP update message may further include the first VPN instance identifier, the first RT, and the second VPN instance identifier.

Optionally, the first BGP update message may further include a first capability identifier, where the first capability identifier is used to identify that the first VPN instance supports L3VPN OAM.

Correspondingly, the second BPG update message may further include a second capability identifier, where the second capability identifier is used to identify that the second VPN instance supports L3VPN OAM.

Optionally, the first VPN instance identifier may include a first RD and a first IP address, where the first RD is an RD of the first VPN instance, and the first IP address is an IP address of the first routing device in this embodiment.

Correspondingly, the VPN instance identifier of the second routing device may include a second RD and a second IP address, where the second RD is an RD of the second VPN instance, and the second IP address is an IP address of the second routing device.

Optionally, the first BGP update message may further include label encapsulation manner identification information, where the label encapsulation manner identification information is used to identify that the first routing device in this embodiment replaces a VPN private network route label, used in a service forwarding process, with a second VPN instance label, and encapsulates the second VPN instance label and a tunnel label into a VPN packet in the service forwarding process; or the label encapsulation manner identification information is used to identify that the first routing device in this embodiment adds a second VPN instance label to a label used in a service forwarding process, and encapsulates the second VPN instance label, a VPN private network route label, and a tunnel label into a VPN packet in the service forwarding process.

The functional units of the first routing device in this embodiment may be configured to perform the procedure of the label distribution method shown in FIG. 1A, a specific working principle thereof is not repeatedly described again, and for details, refer to the descriptions in the method embodiment.

The first routing device in this embodiment may be a PE, which is not limited herein.

The first routing device in this embodiment cooperates with a second routing device cooperate to extend the MP-BGP and learn a VPN instance from each other, so as to identify a VPN instance, and can allocate a label to the VPN instance instead of a VPN private network route after identifying the VPN instance; in this way, when the first routing device used as a service tail end node receives an L3VPN service packet carrying a first VPN instance label, the first routing device can identify, according to the VPN instance label in the packet, that an L3VPN service specifically comes from a second VPN instance, which solves a problem of identifying a source end of the L3VPN service. Optionally, after identifying that the L3VPN service comes from the second VPN instance, the first routing device in this embodiment can further perform effective fault location and performance detection on the L3VPN service by using an OAM technology, which solves a problem of L3VPN OAM, and provides a basis for further development of an L3VPN OAM technology.

Figure 3B:
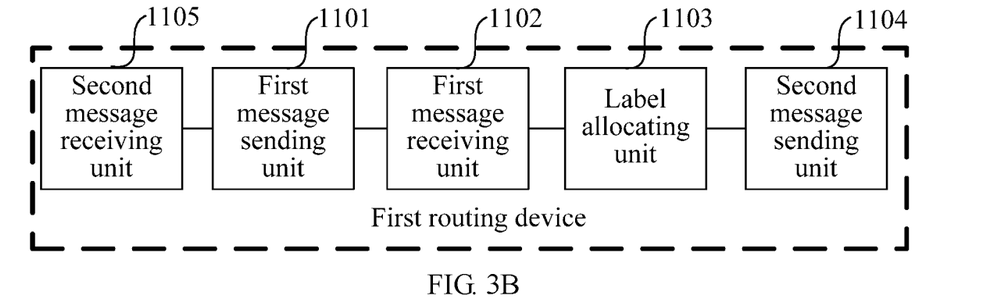
FIG. 3B is a schematic structural diagram of a first routing device according to another embodiment of the present invention.

FIG. 3B is a schematic structural diagram of a first routing device according to another embodiment of the present invention. This embodiment is implemented based on the embodiment shown in FIG. 3A. As shown in FIG. 3B, the first routing device in this embodiment also includes: a first message sending unit 1101, a first message receiving unit 1102, a label allocating unit 1103, and a second message sending unit 1104, and each unit also has the function described in the embodiment shown in FIG. 3A.

Further, the first routing device in this embodiment further includes a second message receiving unit 1105. The second message receiving unit 1105 is configured to receive a fourth BGP update message sent by the second routing device, where the fourth BGP update message includes a second VPN instance identifier, the second RT, the first VPN instance identifier, and a second VPN instance label. The second message receiving module specifically receives, after the first message sending unit 1101 sends the first BGP update message to the second routing device, the fourth BGP update message sent by the second routing device. Optionally, the second message receiving unit 1105 is connected to the first message sending unit 1101.

The second VPN instance label is a VPN instance label that is allocated by the second routing device to the first VPN instance after the second routing device determines that the first RT is equal to the second RT.

The functional units may be configured to perform the procedure of the label distribution method shown in FIG. 1A, a specific working principle thereof is not repeatedly described again, and for details, refer to the descriptions in the method embodiment.

The first routing device in this embodiment cooperates with a second routing device to extend the MP-BGP and learn a VPN instance from each other, so as to identify a VPN instance, and can allocate a label to the VPN instance instead of a VPN private network route after identifying the VPN instance; in this way, when the first routing device used as a service tail end node receives an L3VPN service packet carrying a first VPN instance label, the first routing device can identify, according to the VPN instance label in the packet, that an L3VPN service specifically comes from a second VPN instance, which solves a problem of identifying a source end of the L3VPN service. Optionally, after identifying that the L3VPN service comes from the second VPN instance, the first routing device in this embodiment can further perform effective fault location and performance detection on the L3VPN service by using an OAM technology, which solves a problem of L3VPN OAM, and provides a basis for further development of an L3VPN OAM technology.

Figure 4A:
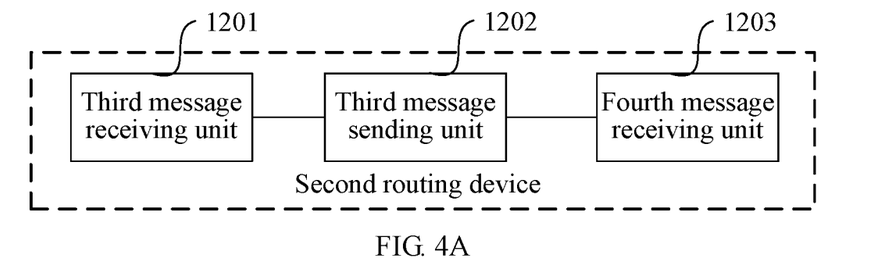
FIG. 4A is a schematic structural diagram of a second routing device according to an embodiment of the present invention.

FIG. 4A is a schematic structural diagram of a second routing device according to an embodiment of the present invention. As shown in FIG. 4A, the second routing device in this embodiment includes: a third message receiving unit 1201, a third message sending unit 1202, and a fourth message receiving unit 1203.

The third message receiving unit 1201 is configured to receive a first BGP update message sent by a first routing device, where the first BGP update message includes a first VPN instance identifier and a first RT, where the first VPN instance identifier is used to identify a first VPN instance on the first routing device, and the first RT is an RT of the first VPN instance. Optionally, the third message receiving unit 1201 is a physical receive port.

The third message sending unit 1202 is connected to the third message receiving unit 1201, and is configured to send a second BGP update message to the first routing device after it is determined that the first RT received by the third message receiving unit 1201 is equal to a second RT, where the second BGP update message includes a second VPN instance identifier and the second RT, where the second VPN instance identifier is used to identify a second VPN instance on the second routing device in this embodiment, and the second RT is an RT of the second VPN instance. Optionally, the third message sending unit 1202 includes a processor configured to determine whether the first RT is equal to the second RT, and a physical transmit port configured to send the second BGP update message.

The fourth message receiving unit 1203 is configured to receive a third BGP update message sent by the first routing device, where the third BGP update message includes a first VPN instance label, where the first VPN instance label is a VPN instance label that is allocated by the first routing device to the second VPN instance after the first routing device determines that the first RT is equal to the second RT. The fourth message receiving unit 1203 specifically receives, after the third message sending unit 1202 sends the second BGP update message to the first routing device, the third BGP update message sent by the first routing device. Optionally, the fourth message receiving unit 1203 is connected to the third message sending unit 1202.

Optionally, the third BGP update message may further include the first VPN instance identifier, the first RT, and the second VPN instance identifier.

Optionally, the first BGP update message may further include a first capability identifier. The first capability identifier is used to identify that the first VPN instance supports L3VPN OAM.

Correspondingly, the second BGP update message may further include a second capability identifier. The second capability identifier is used to identify that the second VPN instance supports L3VPN OAM.

The first VPN instance identifier includes a first RD and a first IP address, where the first RD is an RD of the first VPN instance, and the first IP address is an IP address of the first routing device.

Correspondingly, the second VPN instance identifier includes a second RD and a second IP address, where the second RD is an RD of the second VPN instance, and the second IP address is an IP address of the second routing device in this embodiment.

Optionally, the first BGP update message may further include label encapsulation manner identification information. The label encapsulation manner identification information is used to identify that the first routing device replaces a VPN private network route label, used in a service forwarding process, with a second VPN instance label, and encapsulates the second VPN instance label and a tunnel label into the VPN packet in the service forwarding process. Alternatively, the label encapsulation manner identification information is used to identify that the first routing device adds the second VPN instance label to a label used in the service forwarding process, and encapsulates the second VPN instance label, a VPN private network route label, and a tunnel label into the VPN packet in the service forwarding process.

The functional units of the second routing device in this embodiment may be configured to perform the procedure of the label distribution method shown in FIG. 2, a specific working principle thereof is not repeatedly described again, and for details, refer to the descriptions in the method embodiment.

The second routing device in this embodiment may be a PE, which is not limited herein.

The second routing device in this embodiment cooperates with a first routing device to extend the MP-BGP and learn a VPN instance from each other, so as to identify a VPN instance, and can allocate a label to the VPN instance instead of a VPN private network route after identifying the VPN instance, so that when the first routing device used as a service tail end node receives an L3VPN service packet carrying a first VPN instance label, the first routing device can identify, according to the VPN instance label in the packet, that an L3VPN service specifically comes from a second VPN instance, which solves a problem of identifying a source end of the L3VPN service. Optionally, after identifying that the L3VPN service comes from the second VPN instance, the first routing device can further perform effective fault location and performance detection on the L3VPN service by using an OAM technology, which solves a problem of L3VPN OAM, and provides a basis for further development of an L3VPN OAM technology.

Figure 4B:
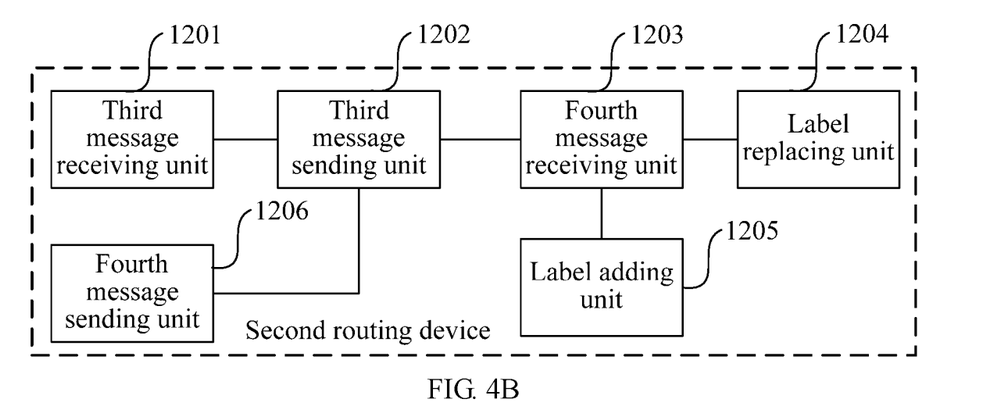
FIG. 4B is a schematic structural diagram of a second routing device according to another embodiment of the present invention.

FIG. 4B is a schematic structural diagram of a second routing device according to another embodiment of the present invention. This embodiment is implemented based on the embodiment shown in FIG. 4A. As shown in FIG. 4B, the second routing device in this embodiment also includes: a third message receiving unit 1201, a third message sending unit 1202, and a fourth message receiving unit 1203, and each unit also has the function described in the embodiment shown in FIG. 4A.

Further, the second routing device in this embodiment may further include: a label replacing unit 1204.

The label replacing unit 1204 is configured to replace a VPN private network route label used in a service forwarding process with the first VPN instance label received by the fourth message receiving unit 1203, so as to encapsulate the first VPN instance label and a tunnel label into a VPN packet in the service forwarding process. Optionally, the label replacing unit 1204 is connected to the fourth message receiving unit 1203.

Optionally, the second routing device in this embodiment may further include: a label adding unit 1205.

The label adding unit 1205 is configured to add the first VPN instance label received by the fourth message receiving unit 1203 to the label used in the service forwarding process, so as to encapsulate the first VPN instance label, the VPN private network route label, and the tunnel label into the VPN packet in the service forwarding process. Optionally, the label adding unit 1205 is connected to the fourth message receiving unit 1203.

Further, the second routing device in this embodiment further includes: a fourth message sending unit 1206.

The fourth message sending unit 1206 is configured to send a fourth BGP update message to the first routing device, where the fourth BGP update message includes a second VPN instance identifier, the second RT, the first VPN instance identifier received by the third message receiving unit 1201, and a second VPN instance label.

The second VPN instance label is a VPN instance label that is allocated by the fourth message sending unit 1206 in the second routing device to the first VPN instance after it is determined that the first RT is equal to the second RT. Optionally, the fourth message sending unit 1206 is connected to the third message sending unit 1202.

The functional units may be configured to perform the procedure of the label distribution method shown in FIG. 2, a specific working principle thereof is not repeatedly described again, and for details, refer to the descriptions in the method embodiment.

The second routing device in this embodiment cooperates with a first routing device to extend the MP-BGP and learn a VPN instance from each other, so as to identify a VPN instance, and can allocate a label to the VPN instance instead of a VPN private network route after identifying the VPN instance, so that when the first routing device used as a service tail end node receives an L3VPN service packet carrying a first VPN instance label, the first routing device can identify, according to the VPN instance label in the packet, that an L3VPN service specifically comes from a second VPN instance, which solves a problem of identifying a source end of the L3VPN service. Optionally, after identifying that the L3VPN service comes from the second VPN instance, the first routing device can further perform effective fault location and performance detection on the L3VPN service by using an OAM technology, which solves a problem of L3VPN OAM, and provides a basis for further development of an L3VPN OAM technology. Further, when the second routing device in this embodiment used as a service tail end node receives an L3VPN service carrying a second VPN instance label, the second routing device can identify, according to the VPN instance label in the packet, that the L3VPN service comes from the first VPN instance, which solves a problem of identifying a source end of the L3VPN service. Optionally, after identifying that the L3VPN service comes from the first VPN instance, the second routing device in this embodiment can further perform effective fault location and performance detection on the L3VPN service by using an OAM technology, which solves a problem of L3VPN OAM, and provides a basis for further development of an L3VPN OAM technology.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to a part or all technical features thereof, as long as these modifications or replaces do not cause the essence of corresponding technical solutions to depart from the scope of the technical solutions of the embodiments of the present invention.

What is claimed is:

1. A method for implementing communication comprising:

allocating, by a first routing device, a first virtual private network (VPN) instance label to a second VPN instance on a second routing device;

receiving, by the first routing device, a first VPN service packet from the second VPN instance, wherein the first VPN service packet carries the first VPN instance label; and identifying, by the first routing device, in response to the first VPN instance label carried in the first VPN service packet being the same as the first VPN instance label allocated to the second VPN instance, that the first VPN service packet comes from the second VPN instance.

2. The method according to claim 1, wherein before allocating the first VPN instance label, further comprising:
sending, by the first routing device, a Border Gateway Protocol (BGP) update message to the second routing device, wherein the BGP update message comprises the first VPN instance label allocated by the first routing device to the second VPN instance.

3. The method according to claim 1, wherein before allocating the first VPN instance label, further comprising:
sending, by the first routing device, a BGP update message to the second routing device, wherein the BGP update message comprises a first capability identifier, wherein the first capability identifier is used to identify that the first VPN instance supports VPN operation, administration and maintenance (OAM).

4. The method according to claim 1, wherein before allocating the first VPN instance label, further comprising:
sending, by the first routing device, a BGP update message to the second routing device, wherein the BGP update message comprises label encapsulation manner identification information, wherein the label encapsulation manner identification information is used to identify that the first routing device replaces a VPN private network route label used in a service forwarding process with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, wherein the second VPN instance label is a VPN instance label that is allocated by the second routing device to a first VPN instance on the first routing device.

5. The method according to claim 1, further comprising:
sending, by the first routing device, a second VPN service packet to the second VPN instance, wherein the second VPN service packet carries a second VPN instance label, the second VPN instance label is a VPN instance label that is allocated by the second routing device to a first VPN instance on the first routing device.

6. The method according to claim 5, before sending the second VPN service packet, further comprising:
receiving, by the first routing device, a BGP update message from the second VPN instance, wherein the BGP update message comprises the second VPN instance label.

7. A method for implementing communication comprising:
allocating, by a first routing device, a first virtual private network (VPN) instance label to a second VPN instance on a second routing device;
sending, by the second routing device, a first VPN service packet to the first routing device, wherein the first VPN service packet carries the first VPN instance label;
receiving, by the first routing device, the first VPN service packet; and
identifying, by the first routing device, in response to the first VPN instance label carried in the first VPN service packet being the same as the first VPN instance label allocated to the second VPN instance, that the first VPN service packet comes from the second VPN instance.

8. The method according to claim 7, before sending the first VPN service packet by the second routing device, further comprising:
sending, by the first routing device, a Border Gateway Protocol (BGP) update message to the second routing device, wherein the BGP update message carries the first VPN instance label allocated by the first routing device to the second VPN instance.

9. The method according to claim 7, before sending the first VPN service packet by the second routing device, further comprising:
sending, by the first routing device, a BGP update message to the second routing device, wherein the BGP update message comprises a first capability identifier, wherein the first capability identifier is used to identify that the first VPN instance supports VPN operation, administration and maintenance (OAM).

10. The method according to claim 7, before sending the first VPN service packet by the second routing device, further comprising:
sending, by the first routing device, a BGP update message to the second routing device, wherein the BGP update message comprises label encapsulation manner identification information, wherein the label encapsulation manner identification information is used to identify that the first routing device replaces a VPN private network route label used in a service forwarding process with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, wherein the second VPN instance label is a VPN instance label that is allocated by the second routing device to a first VPN instance on the first routing device.

11. A first routing device, comprising:
a processor; and
a non-transitory computer-readable storage programming for execution by the processor, the programming includes instructions to:
allocate a first virtual private network (VPN) instance label to a second VPN instance on a second routing device;
receive a first virtual private network (VPN) service packet from the second VPN instance, wherein the first VPN service packet carries the first VPN instance label; and
identify, in response to the first VPN instance label carried in the first VPN service packet being the same as the first VPN instance label allocated to the second VPN instance, that the first VPN service packet comes from the second VPN instance.

12. The first routing device according to claim 11, wherein when the instructions are executed by the processor, further cause the first routing device to:
send, before receiving the first VPN service packet, a Border Gateway Protocol (BGP) update message to the second routing device, wherein the BGP update message comprises the first VPN instance label allocated by the first routing device to the second VPN instance.

13. The first routing device according to claim 11, wherein when the instructions are executed by the processor, further cause the first routing device to:
   send a BGP update message to the second routing device, wherein the BGP update message comprises a first capability identifier, wherein the first capability identifier is used to identify that the first VPN instance supports VPN operation, administration and maintenance (OAM).

14. The first routing device according to claim 11, wherein when the instructions are executed by the processor, further cause the first routing device to:
   send a BGP update message to the second routing device, wherein the BGP update message comprises label encapsulation manner identification information, wherein the label encapsulation manner identification information is used to identify that the first routing device replaces a VPN private network route label used in a service forwarding process with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, wherein the second VPN instance label is a VPN instance label that is allocated by the second routing device to a first VPN instance on the first routing device.

15. The first routing device according to claim 11, wherein when the instructions are executed by the processor, further cause the first routing device to:
   send a second VPN service packet to the second VPN instance, wherein the second VPN service packet carries a second VPN instance label, the second VPN instance label is a VPN instance label that is allocated by the second routing device to a first VPN instance on the first routing device.

16. The first routing device according to claim 15, wherein when the instructions are executed by the processor, further cause the first routing device to:
   receive a BGP update message from the second VPN instance, wherein the BGP update message comprises the second VPN instance label.

17. A system, comprising:
   a second routing device configured to send a first virtual private network (VPN) service packet to a first routing device, wherein the first VPN service packet carries a first VPN instance label; and
   a first routing device configured to:
      allocate the first VPN instance label to a second VPN instance on the second routing device;
      receive the first VPN service packet carrying the first VPN instance label; and
      identify, in response to the first VPN instance label carried in the first VPN service packet being the same as the first VPN instance label allocated to the second VPN instance, that the first VPN service packet comes from the second VPN instance.

18. The system according to claim 17, wherein the first routing device is further configured to:
   send a Border Gateway Protocol (BGP) update message to the second routing device, wherein the BGP update message carries the first VPN instance label.

19. The system according to claim 17, wherein the first routing device is further configured to:
   send a BGP update message to the second routing device, wherein the BGP update message comprises a first capability identifier, wherein the first capability identifier is used to identify that the first VPN instance supports VPN operation, administration and maintenance (OAM).

20. The system according to claim 17, wherein the first routing device is further configured to:
   send a BGP update message to the second routing device, wherein the BGP update message comprises label encapsulation manner identification information, wherein the label encapsulation manner identification information is used to identify that the first routing device replaces a VPN private network route label used in a service forwarding process with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, wherein the second VPN instance label is a VPN instance label that is allocated by the second routing device to a first VPN instance on the first routing device.

21. A computer-readable storage medium storing instructions, when the instructions are executed by a first routing device, cause the first routing device to:
   allocate a first virtual private network (VPN) instance label to a second VPN instance on a second routing device;
   receive a first virtual private network (VPN) service packet from the second VPN instance, wherein the first VPN service packet carries the first VPN instance label; and
   identify, in response to the first VPN instance label carried in the first VPN service packet being the same as the first VPN instance label allocated to the second VPN instance, that the first VPN service packet comes from the second VPN instance.

22. The computer-readable storage medium according to claim 21, wherein when the instructions are executed by the first routing device, further cause the first routing device to:
   send before receiving the first VPN service packet, a Border Gateway Protocol (BGP) update message to the second routing device, wherein the BGP update message comprises the first VPN instance label allocated by the first routing device to the second VPN instance.

23. The computer-readable storage medium according to claim 21, wherein when the instructions are executed by the first routing device, further cause the first routing device to:
   send a BGP update message to the second routing device, wherein the BGP update message comprises a first capability identifier, wherein the first capability identifier is used to identify that the first VPN instance supports VPN operation, administration and maintenance (OAM).

24. The computer-readable storage medium according to claim 21, wherein when the instructions are executed by the first routing device, further cause the first routing device to:
   send a BGP update message to the second routing device, wherein the BGP update message comprises label encapsulation manner identification information, wherein the label encapsulation manner identification information is used to identify that the first routing device replaces a VPN private network route label used in a service forwarding process with a second VPN instance label, and encapsulates the second VPN instance label and a tunnel label into a VPN packet in the service forwarding process, or identify that the first routing device adds a second VPN instance label to a label used in a service forwarding process, and encapsulates the second VPN instance label, a VPN private network route label, and a tunnel label into a VPN packet in the service forwarding process, wherein the second VPN instance label is a VPN instance label that is allocated by the second routing device to a first VPN instance on the first routing device.

* * * * *